(12) United States Patent
Lehnhardt et al.

(10) Patent No.: US 6,439,671 B1
(45) Date of Patent: Aug. 27, 2002

(54) EXTRUDED ALUMINUM VEHICLE WHEEL

(75) Inventors: Aaron Lehnhardt, Pleasanton, CA (US); Bruce Preston Williams, Grosse Point Park, MI (US); Michael Gousotti Ellis, Plymouth, MI (US); Thomas Scott, Bloomfield Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/757,999

(22) Filed: Jan. 10, 2001

Related U.S. Application Data
(60) Provisional application No. 60/175,354, filed on Jan. 10, 2000.

(51) Int. Cl.$^7$ .......................... B60B 1/06; B60B 25/00; B60B 3/00; B21K 1/34; B23P 17/00
(52) U.S. Cl. .......................... 301/84; 31/10.1; 31/12.1; 29/894.341
(58) Field of Search .................. 29/894.321, 894.34, 29/894.341, DIG. 47, 894.342, 894.343; 301/84 I, 9.1, 10.1, 12.1, 12.2, 14, 65, 67, 68, 69, 70, 71, 79, 80, 95.101, 95.104, 105.1, 11.1, 11.2, 35.54, 35.59, 104, 78, 74, 84, 85

(56) References Cited

U.S. PATENT DOCUMENTS

| | | | | | |
|---|---|---|---|---|---|
| 2,048,177 A | * | 7/1936 | Burger | ...................... | 301/10.1 |
| 2,149,113 A | * | 2/1939 | Buss | ...................... | 301/35.59 |
| 2,559,975 A | * | 7/1951 | Lange et al. | ............... | 301/12.1 |
| 2,660,476 A | * | 11/1953 | Jacobi | ....................... | 301/10.1 |
| 2,884,280 A | * | 4/1959 | Atkin | ....................... | 301/12.1 |
| 3,275,378 A | * | 9/1966 | Malthaner | .................. | 301/12.1 |
| 3,314,727 A | * | 4/1967 | Murphy | .................... | 301/12.1 |
| 3,874,055 A | * | 4/1975 | Wilcox | .................. | 29/894.342 |
| 4,173,374 A | * | 11/1979 | Resele et al. | ................. | 301/80 |
| 4,256,348 A | * | 3/1981 | Lester et al. | ............. | 301/35.59 |
| 5,558,406 A | | 9/1996 | Melbinger et al. | | |
| 6,244,669 B1 | * | 6/2001 | Braunschweiler | ............ | 301/84 |

* cited by examiner

Primary Examiner—S. Joseph Morano
Assistant Examiner—Jason R. Bellinger
(74) Attorney, Agent, or Firm—Damian Porcari (57) ABSTRACT

A vehicle wheel is disclosed that is made up of a plurality of extrusions. A rim may be provided in either a cylindrical form or in the form of a series of arcuate segments. Rim attachment brackets are provided to secure spokes to the rim. Spokes are provided between the rim and a hub that defines an axle aperture. The rim is roll formed to form tire retention beads and the outer surface of the rim that's in the abstract.

17 Claims, 7 Drawing Sheets

EXTRUDED ALUMINUM VEHICLE WHEEL

CROSS-REFERENCE TO RELATED APPLICATIONS

This application claims the benefit of U.S. provisional application Ser. No. 60/175,354, filed Jan. 10, 2000.

TECHNICAL FIELD

The present invention relates to vehicle wheels made from extruded aluminum parts that are subsequently assembled together.

BACKGROUND ART

Vehicle wheels are typically cast or forged and machined to create a high strength wheel. Cast wheels including a decorative surface must be machined and polished. These manufacturing processes may result in high unit costs, tooling, handling and machining costs.

One-piece cast aluminum wheels cannot be easily extruded and have complex shapes that are not easily machinable. If there is a flaw in a cast aluminum wheel, it may be necessary to remelt the entire wheel if the defective portion cannot be repaired.

Vehicle wheels must be designed and manufactured for high strength due to the forces applied to vehicle wheels. While high strength is demanded by vehicle wheel applications, the need to reduce the weight of vehicles necessitates that the weight of a vehicle wheel be minimized while meeting all structural and strength requirements.

The above problems and challenges are addressed by applicants' invention as summarized below.

DISCLOSURE OF INVENTION

It is an object of the present invention to provide an improved method of manufacturing a vehicle wheel in a way that reduces manufacturing costs while providing a high strength wheel assembly with good aesthetic appeal.

It is another object of the invention to provide an aluminum wheel assembly comprising a plurality of modular extruded aluminum components that are secured together to form a high strength wheel assembly.

It is yet another object of the method of the present invention to provide a method of manufacturing an aluminum vehicle wheel from individually extruded parts that are secured together to form a high strength wheel assembly.

According to the present invention, a vehicle wheel is provided that includes a rim formed in one piece or from arcuate sections joined together in a circular arrangement. The rim has circumferentially extending slots on a radially inwardly facing surface. A plurality of rim attachment brackets having tabs that are secured in the slots on the rim are each provided with an anchor portion. A plurality of spokes having an outer end are secured to the anchor portions of the rim attachment brackets. The spokes each extend radially inwardly from the anchor portion and have an inner end that is secured to a hub. The hub defines an axle aperture in which the axle of a vehicle is received.

According to another aspect of the invention, two to eight arcuate sections may be joined together to form the rim. The rim preferably has a plurality of circumferentially extending pockets between inner and outer surfaces of the rim.

If the rim is initially formed in arcuate sections, it is preferable to provide first and second circumferentially extending slots and three circumferentially extending pockets. The first slot is preferably disposed between the first and second pockets, and the second slot is disposed between the second and third pockets.

According to another aspect of the invention, the rim attachment brackets have a convex base and two convex ribs having a reentrant lip. The ribs are received in circumferentially extending slots in the rim with the convex space being flush with an inner surface of the rim. The rim attachment brackets each preferably include a boss including an axially oriented opening for receiving a fastener that connects the outer end of each of the spokes to the boss.

The spokes of the wheel each have a tongue with a fastener opening on the outer end. The spokes each have a partially cylindrical receptacle extending axially on their inner ends.

According to the invention, the spokes each have radially extending spaced sidewalls and an X-shaped reinforcement spanning the space between the sidewalls.

According to another aspect of the invention, the hub has a plurality of cylindrical protrusions extending axially along the hub at spaced locations about the hub. The inner end of the spokes are attached to the cylindrical protrusions. Aluminum bonding cement may be used to secure the inner end of the spokes to the cylindrical protrusions.

A method of making a wheel for a vehicle tire is provided according to the present invention. A wheel rim, a plurality of rim attachment bracket bodies, a plurality of spoke bodies, and a wheel hub body are extruded. The wheel rim may be formed in one piece or in multiple pieces by assembling arcuate segments together to form a rim. The rim is then roll formed into a circular shape with tire attachment beads. Circumferentially extending slots are either extruded or machined on a radially inwardly facing surface of the ring. The rim attachment bracket bodies are machined to form rim attachment brackets. Each rim attachment bracket is assembled to the slots in the arcuate segments forming the wheel rim. The spoke bodies are machined to form spokes having an inner end and an outer end. The outer end of each spoke is assembled to one of the rim attachment brackets. The wheel hub body is machined to form a wheel hub, and the inner ends of the spokes are assembled to the wheel hub.

According to another aspect of the method of the present invention, the step of assembling the rim attachment brackets to the rim is performed by snapping ribs formed on the rim attachment brackets into the circumferentially extending slots and bonding the rim attachment brackets to the rim.

According to one version of the method the arcuate segments of the rim are welded together to form the wheel rim.

With the method of the present invention, the outer end of each spoke is assembled to the rim attachment brackets with a fastener while the inner end of the spokes are assembled to the hub and are secured to the hub with aluminum bonding cement.

The extruded attachments feature easily machined surfaces on extruded parts including rim attachment brackets, spokes and hub.

These and other objects and advantages of the method and apparatus of the present invention will be better understood upon review of the attached drawings and in light of the following detailed description of the best mode of practicing in the invention.

BEST MODE FOR CARRYING OUT THE INVENTION

Figure 1:
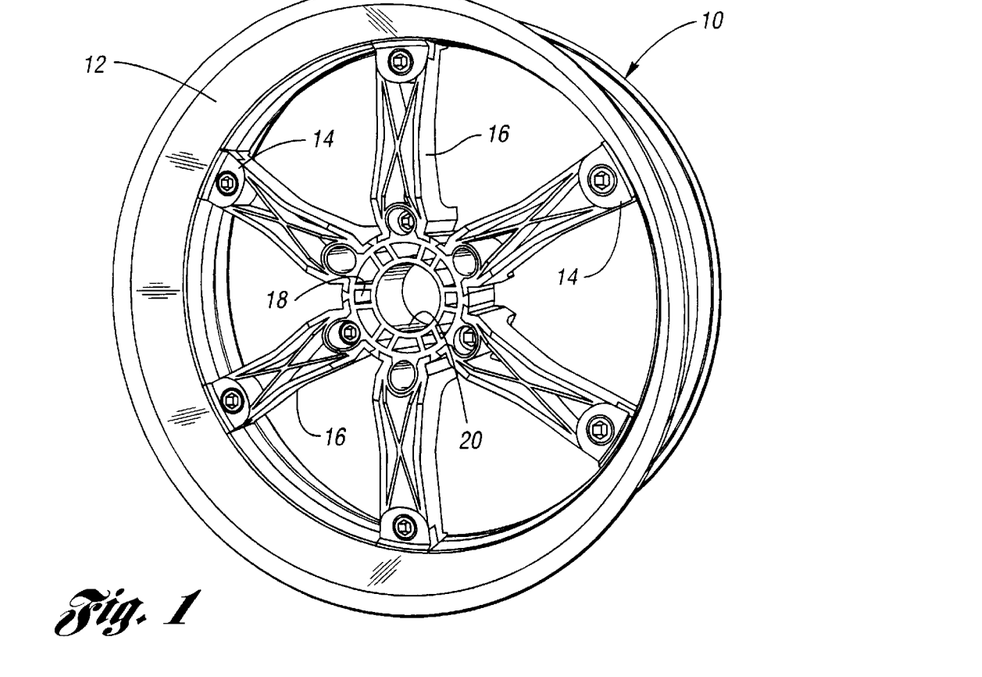
FIG. 1 shows a perspective view of a vehicle wheel made in accordance with the present invention.
Figure 2:
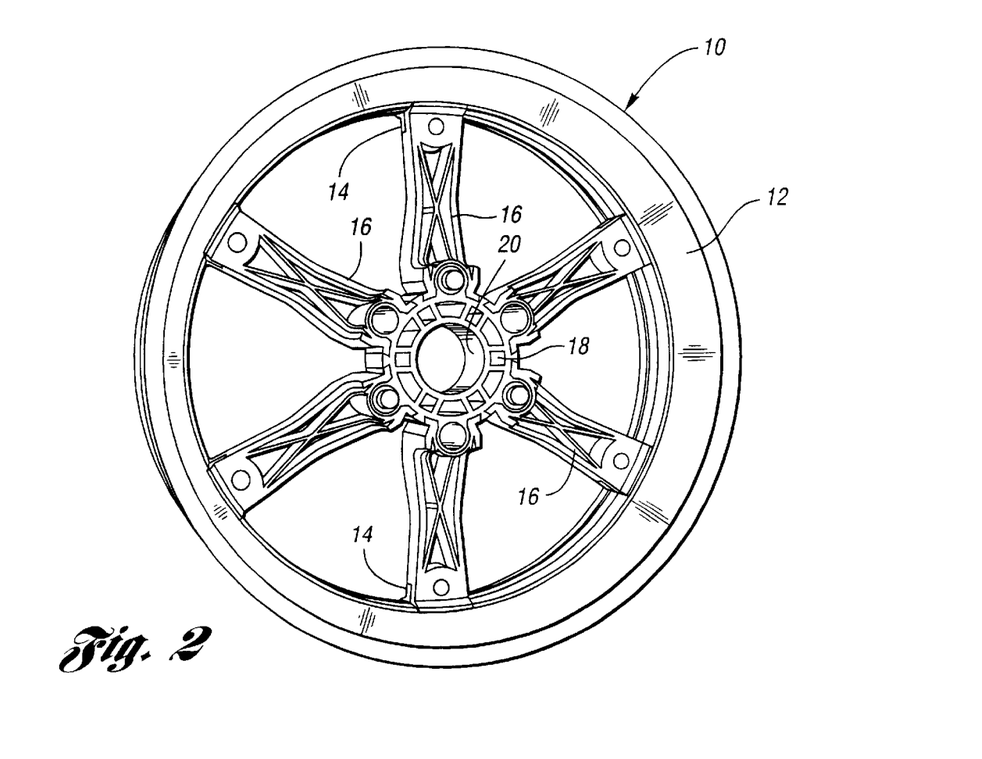
FIG. 2 shows a reverse perspective view of the wheel of FIG. 1.

Referring now to FIGS. 1 and 2, a vehicle wheel 10 made in accordance with the present invention is shown. The wheel 10 includes a rim 12 that may be formed in one piece as a cylindrical extrusion or may be formed in multiple pieces in arcuate segments as will be more specifically described below. Rim attachment brackets 14 are attached to the rim 12. Spokes 16 are attached to the rim attachment brackets 14 and to a hub 18. The hub 18 includes an axle aperture 20.

Figure 3:
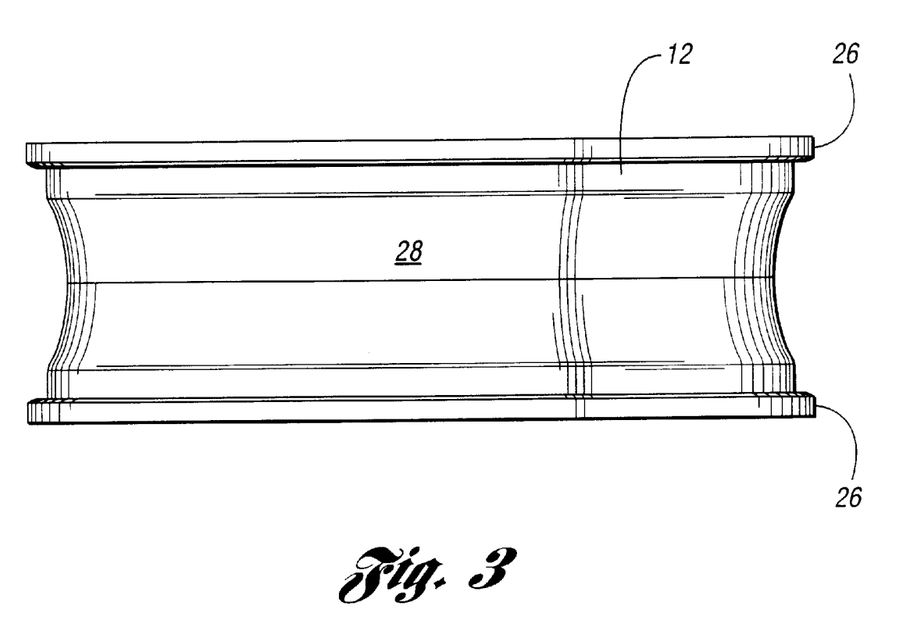
FIG. 3 shows a side view of the wheel of FIG. 1.

Referring now to FIG. 3, the wheel rim 12 is shown to include tire retention beads 26 on opposite axial ends. A concave outer surface 28 is formed between the tire retention beads 26. The concave outer surface 28 and tire retention beads 26 are preferably formed by roll forming the extruded annular ring. The annular ring is rotated and spin formed to shape the rim profile.

Figure 4:
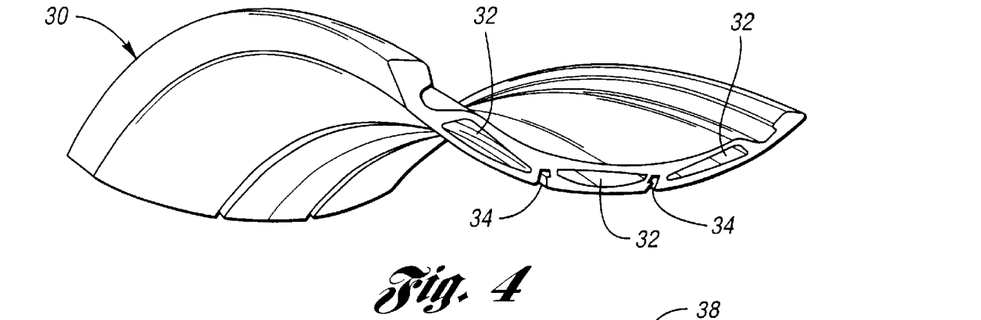
FIG. 4 shows a fragmentary perspective view of an arcuate rim section made in accordance with an alternative embodiment of FIG. 1.

Referring now to FIG. 4, according to an alternative way of forming the rim, arcuate rim segments 30 may be formed by a curved extrusion process and then assembled together to form a complete wheel rim. It is anticipated that between 2 and 8 segments would be required to form a complete rim. The rim segment 30 may incorporate arcuate pockets 32. The arcuate pockets serve to reduce the weight of the wheel and minimize the amount of material required to form the rim. Slots 34 may be formed between the pockets 32. The slots 34 provided to facilitate securing the rim attachment brackets 14 to the rim segment 30.

Figure 5:
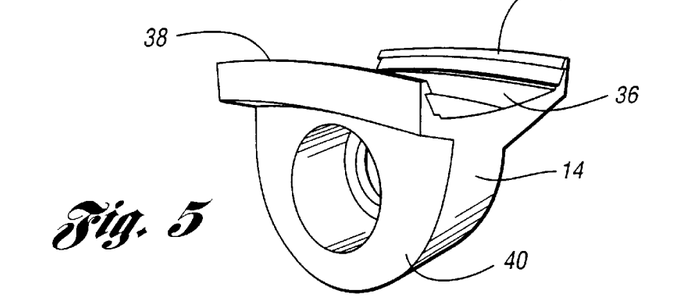
FIG. 5 shows a perspective of a rim attachment bracket made in accordance with the embodiment of FIG. 1.

Referring now to FIG. 5, a rim attachment bracket 14 is shown to include a convex base 36 and convex ribs 38 on opposite sides of the convex base 36. The ribs 38 are received in the slots 34. The ribs 38 preferably include a reentrant or a hook-shaped profile that is received in the slots that also preferably include a lip that engages the reentrant portion of the convex ribs 38. The rim attachment bracket 14 is bonded to the rim 12. An anchor portion 40 defines an axially oriented opening 42. A radial surface 44 is provided by machining an extruded blank for the rim attachment bracket 14.

Figure 6:
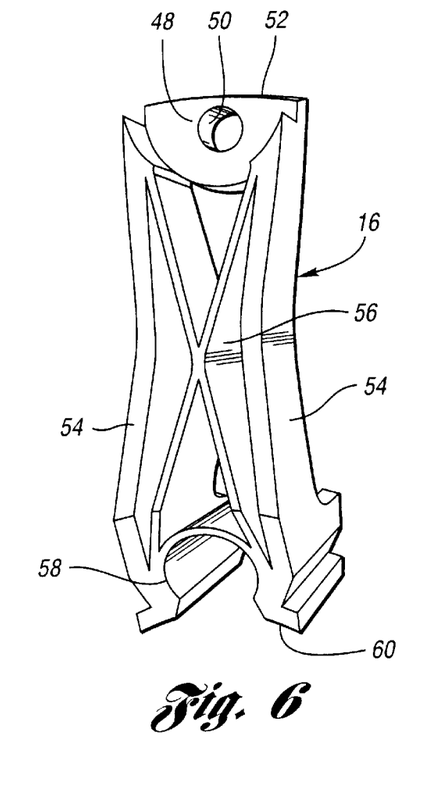
FIG. 6 shows a front perspective view of a spoke made in accordance with the embodiment of FIG. 1.
Figure 7:
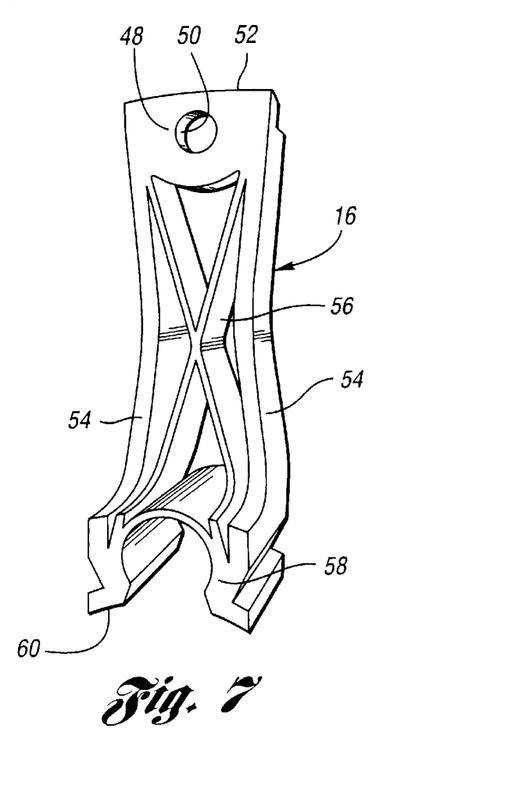
FIG. 7 shows a rear perspective view of the spoke of FIG. 6.

Referring now to FIGS. 6 and 7, the spoke 16 is shown from opposite sides. The spoke 16 includes a tongue 48 that defines an opening 50. The tongue 48 is formed on the outer end 52 of the spoke 16. The outer end 52 is assembled to the rim attachment bracket 14 with the tongue 48 adjacent the anchor portion 40 of the rim attachment bracket 14. The body of the spoke comprises two sidewalls 54 that are reinforced by an Xshaped reinforcement 56 that is provided between the spaced sidewalls 54. A partially cylindrical receptacle 58 is provided on the inner end 60 of the spoke 16. A radial surface 62 on the tongue 48 is adapted to be placed in face-to-face contact with the radial surface 44 of the anchor portion 40 with opening 50 and opening 42 in alignment.

Figure 8:
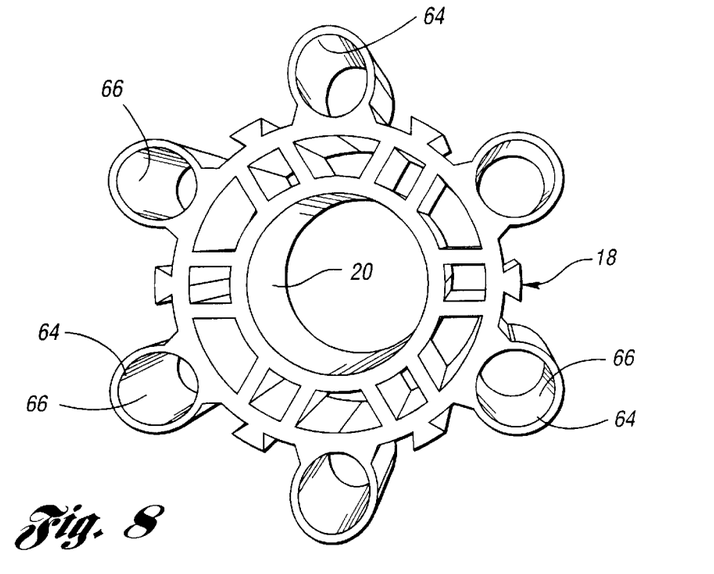
FIG. 8 shows a perspective view of a hub in accordance with the embodiment of FIG. 1.

Referring now to FIG. 8, the hub 18 is shown, including its axle aperture 20 and a plurality of cylindrical protrusions 64. The cylindrical protrusions 64 each include a bore 66. The partially cylindrical receptacles 58 of the spokes 16 are assembled over the cylindrical protrusions 64 and are preferably bonded thereto by means of an aluminum bonding cement.

Figure 9:
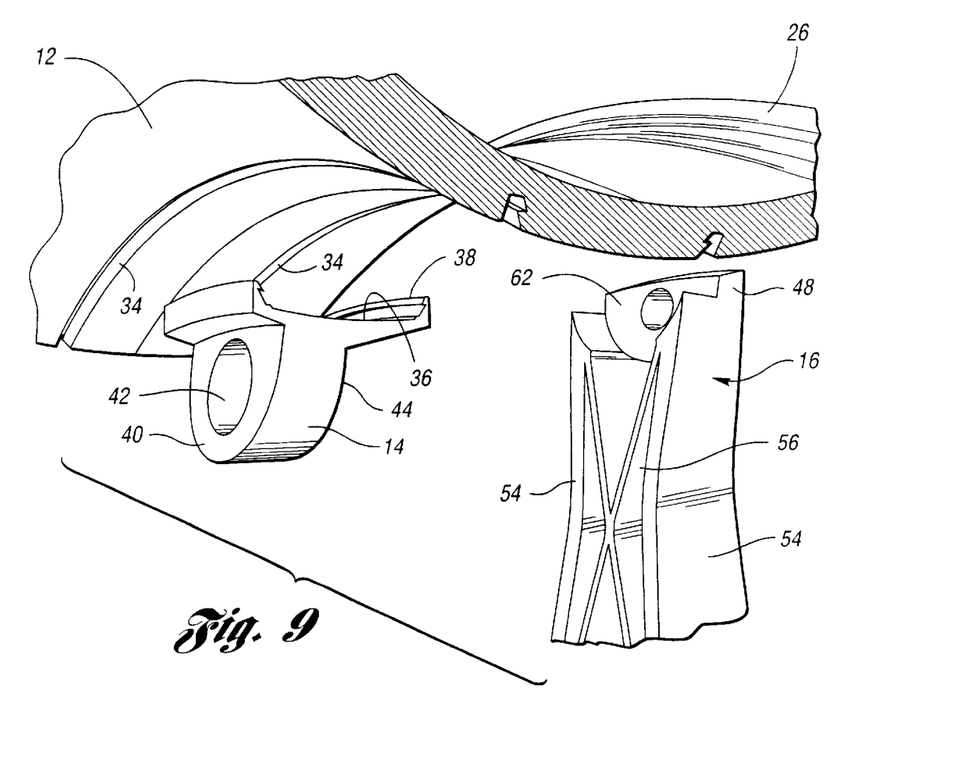
FIG. 9 shows a partially cut-away, exploded, perspective view of the rim, rim attachment and spoke of FIG. 1.

Referring now to FIGS. 9 through 12, assembly of the vehicle wheel 10 is illustrated. Referring specifically to FIG. 9, a rim attachment bracket 14 is shown ready for assembly to the rim 12. The convex ribs 38 on either side of the convex base 36 are inserted into the slots 34. The spoke 16 is then secured to the rim attachment bracket 14 with the radial surface 62 of the tongue 48 placed in contact with the radial surface 44 of the anchor portion 40 of the rim attachment bracket 14.

Figure 10:
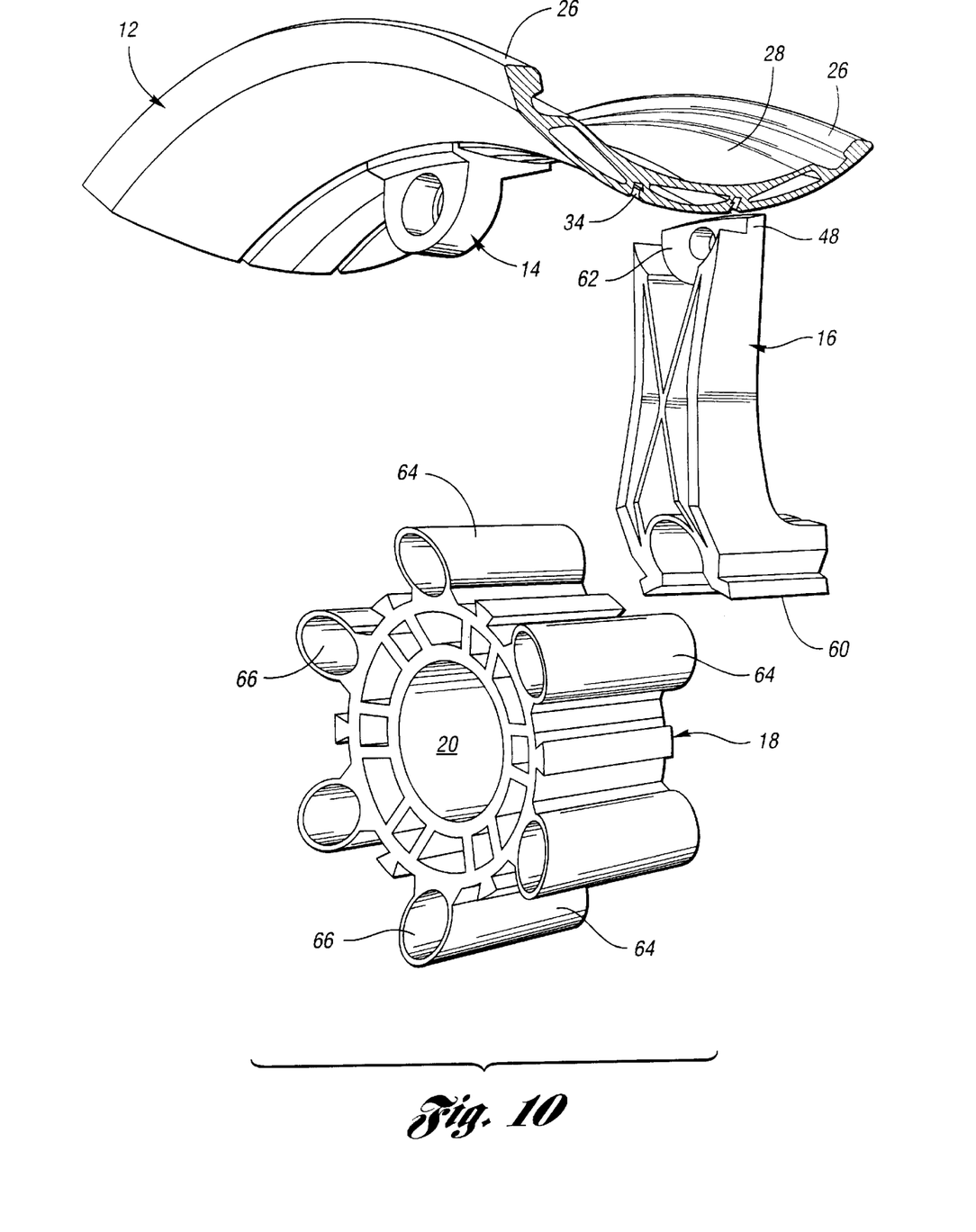
FIG. 10 shows a partially cut-away, exploded view of a rim, rim attachment, spoke and hub in accordance with FIG. 1.

Referring to FIG. 10, attachment of one of the spokes 16 to the hub 18 and rim attachment bracket 14 is shown. The spoke is attached to the rim attachment bracket as described above. The inner end of the spoke 60 is assembled by sliding it axially over the cylindrical protrusion 64.

Figure 11:
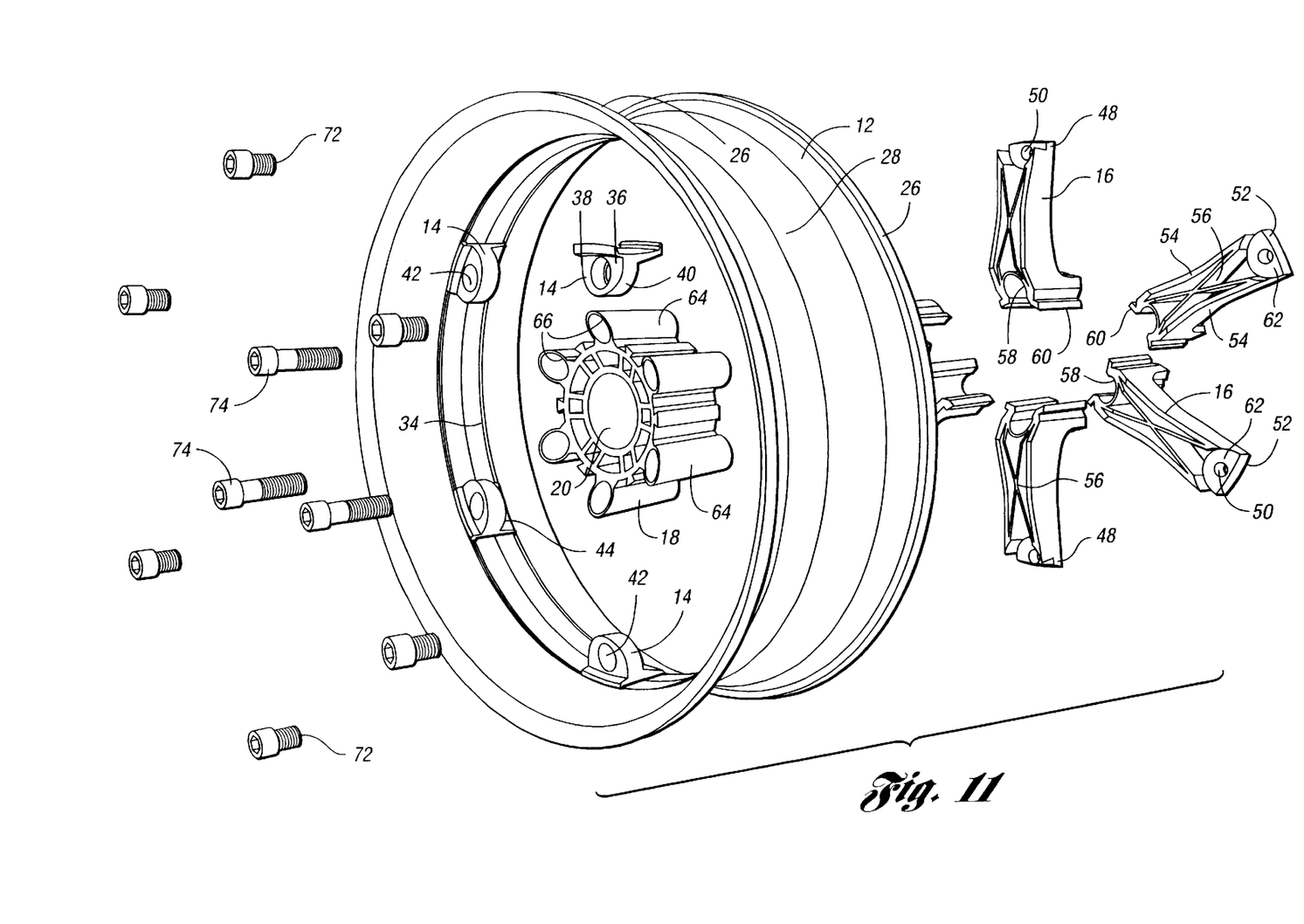
FIG. 11 shows an exploded perspective view of the wheel of FIG. 1.

Referring now to FIG. 11, the wheel assembly is shown with the hub 18 centrally located within the rim 12 and the spokes 16 of the wheel shown ready for assembly between the hub 18 and the rim attachment brackets 14. Spoke fasteners 72 are received in the axially oriented opening 42 of the rim attachment bracket 14 and by the opening 50 in the outer end 52 of the spoke 16. The opening 50 is preferably threaded so that the spoke fasteners 72 may be tightened into the opening 50. Lug nuts 74 are provided to be inserted within the bore 66 of the cylindrical protrusions 64.

Figure 12:
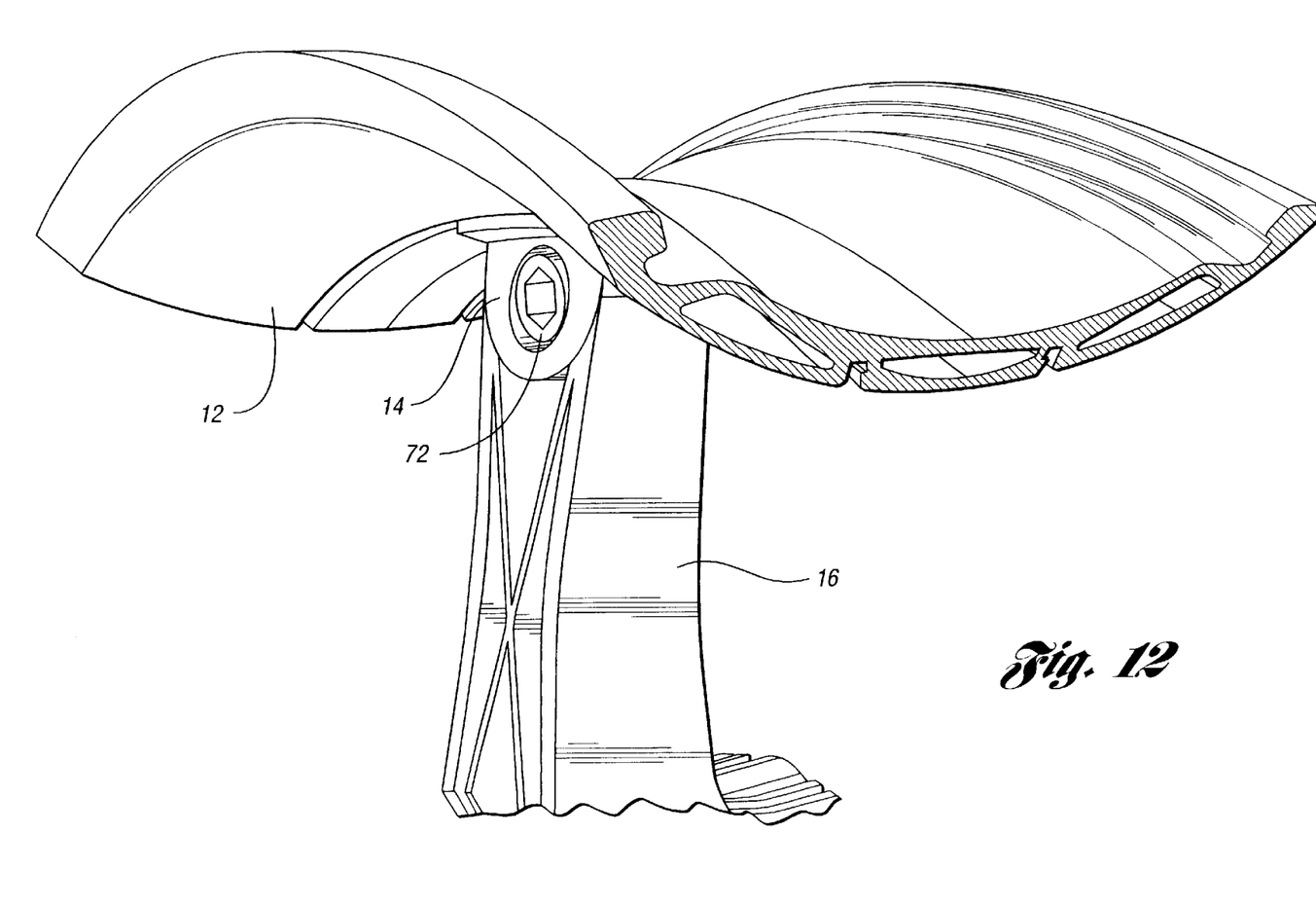
FIG. 12 shows a perspective view of the components of FIG. 9 fully assembled.

Referring now to FIG. 12, a portion of the wheel rim 12 is shown with a rim attachment bracket 14 secured thereto. The spoke 16 is secured to the rim attachment bracket 14 by means of the spoke fastener 72.

While the best mode for carrying out the invention has been described in detail, those familiar with the art to which this invention relates will recognize various alternative designs and embodiments for practicing the invention as defined by the following claims.

What is claimed is:

1. A vehicle wheel comprising:
    a rim having circumferentially extending slots on a radially inwardly facing surface;
    a plurality of rim attachment brackets being bonded to the rim and having ribs that are secured in the slots on the rim, the rim attachment brackets each having an anchor portion;
    a plurality of spokes having an outer end secured to the anchor portion of the rim attachment brackets, the spokes each extending radially inwardly from the anchor portion and having an inner end;

a hub secured to the inner end of each spoke, the hub having an axle aperture.

2. The vehicle wheel of claim 1 wherein the rim is formed from arcuate sections joined together in a circular arrangement.

3. The vehicle wheel of claim 1 wherein the rim has a plurality of circumferentially extending pockets between an inner surface and an outer surface.

4. The vehicle wheel of claim 1 wherein first and second circumferentially extending slots are provided and first, second and third circumferentially extending pockets are provided in axially spaced portions of the rim, the first slot being disposed between the first and second pockets and the second slot being disposed between the second and third pockets.

5. The vehicle wheel of claim 1 wherein the rim attachment brackets have a convex base, and two convex ribs having a reentrant lip, the ribs being received in the circumferentially extending slots with the convex base being flush with an inner surface of the rim.

6. The vehicle wheel of claim 1 wherein the rim attachment brackets each have a boss including an axially oriented opening for receiving a fastener that connects the outer end of each of the spokes to the boss.

7. The vehicle wheel of claim 1 wherein the spokes each have a tongue with a fastener opening on the outer end, and the spokes each have a partially cylindrical receptacle extending axially on the inner end.

8. The vehicle wheel of claim 1 wherein the spokes each have radially extending spaced sidewalls and an X-shaped reinforcement spanning the space between the sidewalls.

9. The vehicle wheel of claim 1 wherein the hub has a plurality of cylindrical protrusions extending axially along the hub at spaced locations about the hub to which the inner end on the spokes are attached.

10. A method of making a wheel for a vehicle tire comprising:

extruding a wheel rim, a plurality of rim attachment bracket bodies, a plurality of spoke bodies, and a wheel hub body;

machining the rim attachment bracket bodies to form rim attachment brackets;

assembling and bonding each rim attachment bracket to the slots in the arcuate segments;

machining the spoke bodies to form spokes having an inner end and an outer end;

assembling the outer end of each spoke to one of the rim attachment brackets;

machining the wheel hub body to form a wheel hub; and assembling the inner ends of the spokes to the wheel hub.

11. The method of claim 10 wherein the step of assembling the rim attachment brackets to the rim is performed by snapping ribs formed on the rim attachment brackets into the circumferentially extending slots and bonding the rim attachment brackets to the rim with aluminum bonding cement.

12. The method of claim 10 wherein the wheel rim is extruded in a plurality of segments and the method further comprises assembling the arcuate segments together.

13. The method of claim 10 wherein the step of assembling the outer end of each spoke to the rim attachment brackets further comprises securing the outer end to the rim attachment bracket with a fastener.

14. The method of claim 10 wherein the step of assembling the inner end of at least some of the spokes to the hub further comprises securing the inner end to the hub with aluminum bonding cement.

15. The method of claim 10 wherein the step of machining the rim attachment bracket bodies comprises machining a flat face thereon that extends radially and circumferentially when assembled to the rim.

16. The method of claim 10 wherein the step of machining the spokes comprises machining a flat surface on a tongue portion of the outer end of each spoke, the flat surface extending radially and circumferentially when assembled to the rim attachment bracket.

17. The method of claim 10 wherein the step of machining the hub includes forming a at least one end face surface on an axially facing surface of the hub, and finishing the axle aperture to form a cylindrical surface thereon.

* * * * *